United States Patent [19]

Hurley et al.

[11] 4,136,518

[45] Jan. 30, 1979

[54] INFRARED RADIATION SUPPRESSOR FOR A GAS TURBINE ENGINE

[75] Inventors: John F. Hurley, Huntington; Clifford R. Banthin, Redding, both of Conn.

[73] Assignee: Avco Corporation, Stratford, Conn.

[21] Appl. No.: 249,827

[22] Filed: May 3, 1972

[51] Int. Cl.² .................................................. F02K 3/04
[52] U.S. Cl. ......................................... 60/264; 60/266
[58] Field of Search ....................... 60/39.66, 264, 266, 60/265, 269

[56] References Cited

U.S. PATENT DOCUMENTS

| | | | |
|---|---|---|---|
| 3,030,005 | 4/1962 | Le Nabour et al. | 60/264 |
| 3,210,934 | 10/1965 | Smale | 60/265 |

*Primary Examiner*—Samuel Feinberg
*Attorney, Agent, or Firm*—Charles M. Hogan; Gary M. Gron

[57] ABSTRACT

An infrared radiation suppressor secured to the discharge end of a gas turbine engine has a series of movable vanes maintained in an open trailing edge configuration in which they form converging flow passages for the gases emanating from the gas turbine engine and passing between the vanes, thereby decreasing the gas static pressure at the vane trailing edges below ambient levels. Flow passages in heat exchange relationship with the duct walls of the suppressor carry ambient air through the passages to a point downstream of the vanes. The lowered static pressure at this point causes ambient air to flow through the passages and into the gas stream, thereby cooling the duct walls and the gas stream. The hollow center of the movable vanes are also open to ambient air at the outer ends. The lowered static pressure at the vane trailing edges also causes large quantities of ambient air to enter into the hollow vanes and out the trailing edges into the gas stream further cooling the gases. The movable vanes may be pivoted to a closed or near closed trailing edge configuration in which they form diverging flow passages to the gases which increase the static pressure of the gases discharged from the engine. This enables the suppressor to function as a highly efficient diffuser when infrared radiation suppression is not needed.

11 Claims, 3 Drawing Figures

INFRARED RADIATION SUPPRESSOR FOR A GAS TURBINE ENGINE

The present invention relates to infrared radiation suppressors and more particularly to suppressors that may be incorporated in gas turbine engines.

Against the highly sophisticated infrared sensors developed over the past years, particularly for military use, an aircraft powered by a gas turbine engine is at a particular disadvantage. The hot gas stream discharge from the gas turbine engine has a temperature of at least 1,000° F. which makes it an excellent source of infrared energy to be detected, as well as the hot metal walls directly in contact with the hot gases. Attempts have been made to reduce the infrared emission by a gas turbine engine through various cooling arrangements designed to cool the hot metal walls. However, the hot gas plume remains as a prime infrared radiation source. Most designs suffer from the problems of either too great a power loss caused by their operation or by a high degree of complexity and weight, and essentially no reduction in hot gas radiation.

Therefore it is an object of the present invention to effectively and simply minimize the infrared radiation from both the exhaust stream and hot metal parts of a gas turbine engine without significantly penalizing engine power during suppressor operation.

These ends are accomplished by an infrared suppressor for a gas turbine engine which comprises duct means forming an outlet flow path for the gas stream discharged from the engine. A plurality of vanes maintained in an open configuration are located in the inlet end of the duct means to form converging flow paths for the hot gases, thereby lowering the static pressure at their trailing edges below ambient. Flow passages for ambient air are formed in heat transfer relationship along the duct means to an outlet adjacent the downstream edge of the vanes. A flow of cooling air thus passes through the flow passages and into the hot gas stream to cool the duct means and the gas stream. In a more specific aspect of the invention, a greater amount of ambient air is fed from ambient directly into the hollow vanes and out the open trailing edges solely for gas cooling purposes.

The above and other related objects and features of the present invention will be apparent from a reading of the following description of the accompanying drawings and the novelty thereof pointed out in the appended claims.

Figure 1:
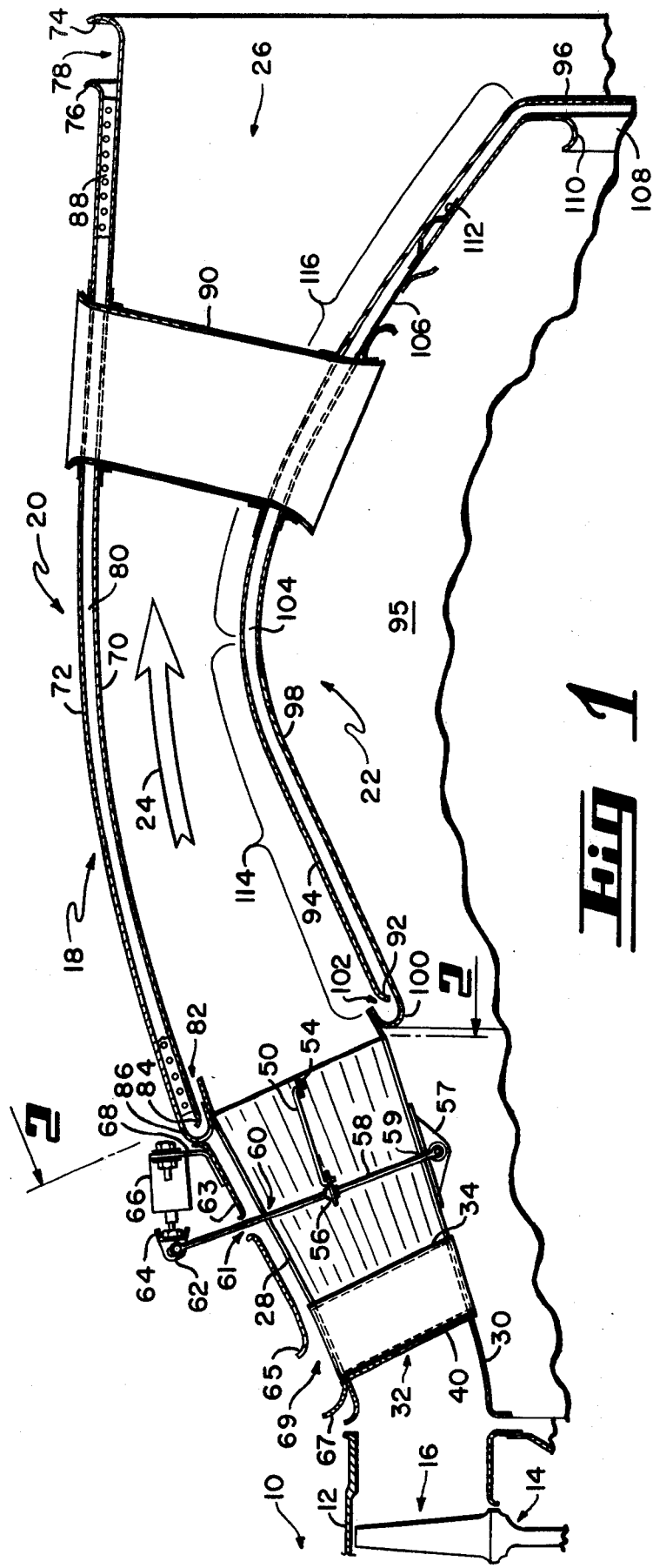
FIG. 1 is a longitudinal section view in simplified form of an infrared radiation suppressor embodying the present invention, along with the discharge end of a gas turbine engine with which it is used.

Referring to FIG. 1, there is shown the aft turbine shroud 12 of a gas turbine engine 10 (only a portion of which is shown). Within this shroud a rotor assembly 14 is journaled and it rotates in response to passage of the hot gas stream across its blades. The gases are discharged from an annular outlet, generally designated by reference character 16, into an infrared radiation suppressor, generally indicated by reference character 18. The details of the gas turbine engine 10 are well known to those skilled in the art so they will not be repeated.

The engine generally comprises a compressor which pressurizes ambient air to a high level and a combustor which receives the air and combines it with fuel to form a fuel-air mixture that is suitably ignited to produce a hot gas stream. From there the gases flow over a turbine which drives the compressor and then either to a power turbine, which extracts energy in the form of a rotary torque output, or to a reaction nozzle which extracts the energy in the form of a propulsive thrust. In either case the temperature of the gases leaving the engine and the temperature of the engine components are extremely high. In accordance with the present invention the infrared suppressor 18 reduces the infrared radiation emission in a fashion that will be discussed below.

The suppressor 18 comprises outer and inner annular duct assemblies, generally indicated by reference characters 20 and 22, to form a generally annular flow path 24 from the gas turbine outlet 16 to the suppressor outlet 26. The inner and outer duct assemblies 22 and 20 have inner and outer annular inlet duct walls 30 and 28, respectively, which form an inlet region to the suppressor. A series of vanes 32 are positioned between ducts 28 and 30 around their circumference and within the inlet flow path to the suppressor.

Figure 3:
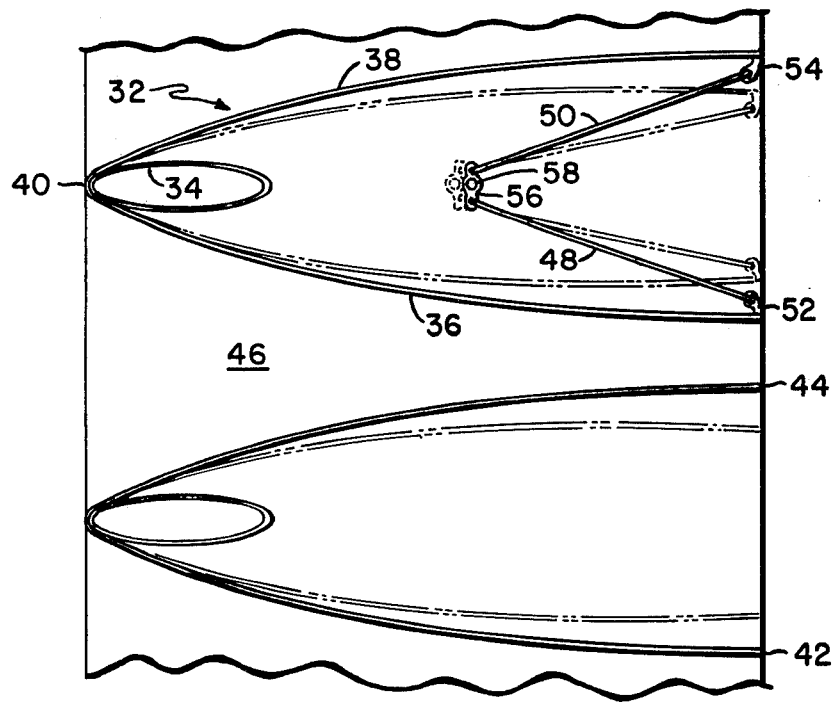
FIG. 3 is a view taken on line 3—3 of FIG. 2.

As shown particularly in FIG. 3, the vanes 32 each comprise a hollow structural radial strut 34 forming a leading edge support for side walls 36 and 38, generally integral with one another and suitably secured to strut 34 at their leading edge 40. The side walls 36, 38 may have a series of generally V-shaped recesses 51, 53, respectively, extending in the direction of hot gas flow to increase the effective length of the trailing edges 42 and 44 which function as an interface between the hot gas stream and cooling air, as later described.

Figure 2:
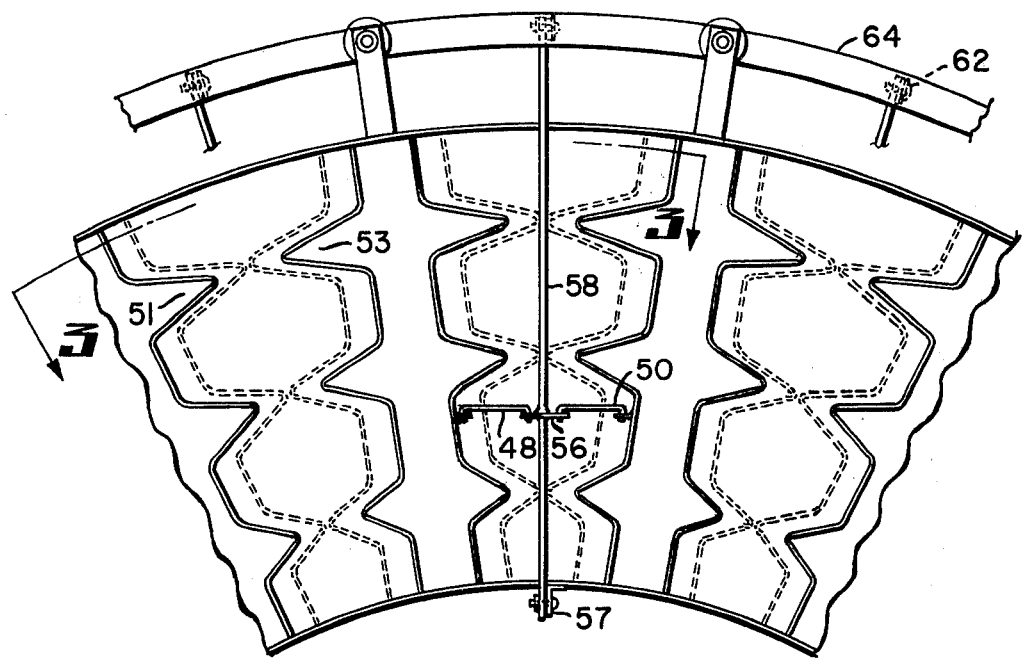
FIG. 2 is an enlarged fragmentary view of movable vanes illustrated in FIG. 1, taken on line 2—2 of FIG. 1.

The leading edge 40 is fixed but the trailing edges 42 and 44 and side walls 36 and 38 are displaceable towards and away from one another. When the side walls of the row of vanes 32 are positioned away from one another, as shown by the solid lines in FIG. 3, they form a series of converging flow passages 46 for the hot gases in the inlet region of the suppressor 18. When the side walls 36 and 38 are displaced towards one another, as shown in phantom in FIG. 3, they form a series of converging and then diverging passageways in this inlet region. In connection with this, it should be noted that although the resultant passage configuration, when viewed in FIG. 2, appears to converge to a constant cross-sectional flow area, the height of the vanes increases as shown in FIG. 1 to such an extent that the resultant three-dimensional flow passages expand and therefore diverge.

The side walls 36 and 38 are each maintained in these converging and diverging configurations by a pair of links 48 and 50 (only one set of which is shown) that connect to brackets 52 and 54 respectively secured to the trailing edges of side walls 36 and 38. Links 48 and 50 are also secured to a bracket 56 mounted on an arm 58 pivotally mounted through hole 59 to a bracket 57 radially inward of duct 30.

Arm 58 extends through an opening 60 in outer duct 28 and through an opening 61 in an annular duct 63. Annular duct 63 extends to a forward edge 65 which forms, in combination with a flange 67 on duct wall 28, an inlet 69 for ambient air to enter the interior of vanes 32 via openings in wall 28. Arm 58 connects with a pivotal mounting bracket 62 on an actuating ring 64. A series of actuators 66 (only one of which is shown) mounted on a flange 68 extending from duct 63 is adapted to displace the ring 64 in a fore and aft direction. This in turn pivots the arms 58 to move the side walls 36 and 38 towards and away from one another through the links 48 and 50. A specific mechanism has been shown to displace the side walls of the vanes 32. However, it is important to note that many specific mechanisms can be employed by those skilled in the art to maintain these vanes in the converging and diverging configurations.

The outer duct assembly 20 further comprises an outer double wall duct comprising annular sheet elements 70 and 72. These annular sheet elements have aft positioned lips 74 and 76, respectively, which form an annular inlet 78 exposed to ambient air. The annular sheet elements 72 and 70 form a flow path 80 in between for ambient air from inlet 78 to an outlet 82 extending downstream into the flow path 24 adjacent the downstream edges of the vanes 32. Outlet 82 is formed by the forward edge 84 of duct 70 and a curved lip 86 of duct 72 connecting with outer wall inlet duct 28. In order to increase the heat transfer surface within annular passage 80, a perforated corrugated insert 88 with the channels formed by the corrugations running in a fore and aft direction, is secured to walls 72 and 70.

A series of tubular airfoil-shaped radial struts 90 are secured to duct walls 72 and 70 and extend inward across the flow path 24 to the inner duct assembly 22. Duct assembly 22 further comprises an outer annular duct wall 94 extending from a forward edge 92 (see FIG. 1) to a closed aft end 96 to form a distribution chamber 95. Duct assembly 22 further comprises an inner duct wall 98 extending from a curved lip 100 secured to the inner inlet duct 30 to form a downstream directed outlet 102 to the flow path 24 adjacent the downstream edge of vanes 32. Duct wall 98 forms, in combination with wall 94, a flow path 104 connected to outlet 102. Flow path 104 has a series of inlets formed from openings 106 just aft of struts 90 and a circular opening 108 formed by lip 110 adjacent end wall 96. Suitable brackets 112, and others not shown, maintain the walls 98 and 94 in a spaced relationship. If desired, a corrugated insert similar to insert 88 may be employed between walls 94 and 98 to increase the heat transfer surface.

Both proceeding with a discussion of the operation of this infrared suppressor, it is pointed out that the flow path through the suppressor 18 has the following characteristics: (1) an inlet region generally defined by ducts 28 and 30 which may be either converging or diverging, depending upon the configuration of the vanes 32, (2) a generally constant flow area mixing region 114 extending aft and radially outward from vanes 32 so that there is an indirect path from the outlet of the gas turbine engine 10 to the outlet 26 of the suppressor, and (3) a diverging outlet region 116 which forms the final outlet from the suppressor to atmosphere.

When the gas turbine engine is operated with the infrared suppressor in operation, the actuators 66 position ring 64 so that side walls 36 and 38 are configured away from each other to form converging inlet flow paths to the hot gas stream. The net effect of this is to increase the Mach number of the hot gas stream while at the same time lowering its static pressure. The amount of convergence is selected so that the static pressure at the downstream edges of the vanes 32 is sufficiently below ambient pressure to insure that ample cooling flow of ambient air is induced in between the duct wall assemblies 20 and 22 to substantially lower their temperature, and the required amount of ambient air is induced into the hollow vane for mixing with and cooling the hot gas stream. The cooling path for the outer duct assembly 20 comprises the inlet 78, annular passage 80 where the insert 88 increases the heat transfer surface from the walls 70 to the cooling gases, and outlet 82 which is connected to the low pressure region downstream of the vanes 32. The cooling air flow through the inner duct assembly 22 passes to the interior of duct wall 98 primarily through hollow struts 90 and, in addition, through struts 34 if it is desired to do so. From there the flow passes through inlet 108 and openings 106 to the annular flow path 104 where the gas cools duct walls 94 before passing through outlet 102. The ambient air passing through these flow paths cools the duct walls which are emitters of infrared radiation. In addition to that, however, the cooling airs from these paths pass into the gas stream flowing through the suppressor to lower its temperature.

The major cooling of the gas stream is, by ambient air, supplied through the hollow vanes 32, connected to ambient air through inlet 69. That cooling air passes between vane side walls 36 and 38 into the low pressure region downstream of the trailing edges 42 and 44 of the vanes to mix with and substantially lower the temperature of the hot gas stream. In order to effectively mix the cooling air with the hot gas stream the constant area mixing region 114 extending aft and radially outward is provided. The mixing region enables the air and gases to achieve a uniform thermal and total pressure state by the time they reach the upstream region of the outlet diffusion region 116 which is exposed directly to ambient air. Thus the temperature of the gases that can be seen by an infrared detector is substantially minimized. The V-shaped recesses 51 and 53 of vanes 32 promote better intermingling and thus mixing of the cooling air and hot gases. The effectiveness of the vane recess mixing reduces the number of vanes needed for a given temperature reduction and a given mixing flow path length 114.

Thus it is seen that when the vanes 32 are in the position in which they form converging hot gas flow passages, they lower the static pressure near their trailing edge to induce a flow of ambient cooling air through the vanes and along the duct walls and into the gas stream. This greatly lowers the surface temperature of the ducts. In addition, it substantially reduces the temperature of the exhaust stream primarily by the ambient air drawn in through the hollow vanes. As an example, a 1:1 air-to-gas mass ratio through the suppression can reduce the exhaust gas temperature from approximately 1,000° F. to 550° F. if ambient cooling air at 100° F. is used.

It is pointed out that a simplified infrared suppressor has been illustrated in the drawings which has ambient air inlets closely adjacent the diffuser. In actual practice the ambient temperatures adjacent an engine would be higher than desired. In this instance suitable ducts would be incorporated to connect the suppressor to a cooler source of ambient air.

When it is no longer necessary to suppress the infrared radiation of the engine, the trailing edges 42 and 44 of vanes 32 are moved toward one another to a more closed position as shown in phantom in FIG. 3. When the vanes are in this position they form generally diverging diffusing flow passages in the inlet region of the suppressor. The divergence of these passages is selected so that a maximum of static pressure recovery is obtained from the gas stream at the vane exit location. From there the gases pass through the outlet diffusion region 116 undergoing further diffusion and static pressure recovery. Finally the gases are dumped to ambient. When the suppressor is in this condition the pressure downstream of the vanes 32 is sufficiently close to ambient so that there is very little cooling flow induced though the flow passages. Thus the engine can operate under normal conditions with no loss in power. This is possible since the suppressor functions as a highly efficient diffuser for normal operation of the engine. Likewise, when the suppressor is operated in the "on" position the energy required to operate the infrared suppressor is minimized since the cooling air is induced directly by ejector action rather than by bleeding off expensive compressor cooling air to drive a pump with all its associated losses. While the preferred embodiment of the present invention has been disclosed, it should be apparent to those skilled in the art that other modifications may be employed without departing from its spirit and scope.

Accordingly, what is claimed as novel and desired to be secured by Letters Patent of the United States is:

1. An infrared suppressor for the hot gas discharge stream from a gas turbine engine, said suppressor comprising:
   duct means forming an outlet flow path for the gas stream from said engine;
   a plurality of vanes positioned in the inlet end of said duct means in said outlet flow path, said vanes being comprised of a pair of side walls joined at the leading edge of each vane and having trailing edges displaceable away from one another to maintain said vanes in a first configuration and displaceable toward one another to maintain said vanes in a second configuration thereby varying the flow path of the hot gas stream across said vanes, one of said configurations forming converging flow paths for the gas stream emanating from said gas turbine engine, thereby lowering the static pressure thereof below ambient pressure; and
   means for forming flow passages for ambient air in heat transfer relationship along said duct means to an outlet adjacent the downstream edge of said vanes whereby a flow of cooling air passes through said flow passages thereby cooling said duct means and into the hot gas stream flowing through said infrared suppressor thereby cooling said gas stream.

2. An infrared suppressor as in claim 1 wherein said first configuration forms said converging passages and the second configuration forms diverging passages for increasing the static pressure of said gas stream to a level sufficient to reduce if not eliminate flow of cooling air through said passages and function as an efficient exhaust diffuser for said engine.

3. An infrared suppressor as in claim 2 further comprising means for displacing said vanes from said first to said second configurations.

4. An infrared suppressor as in claim 3 wherein:
   said displacing means comprises a series of arms pivotally mounted at a point radially inward of said vanes and in between said vane side walls, an actuating ring pivotally connected to the radially outward portions of said arms and displaceable in a fore and aft direction, linkages connected to said arms in between said pivotal mounting and said actuator ring and connected to the trailing edges of said side walls and means for displacing said actuating ring in a fore and aft direction whereby the trailing edges of said vanes are displaced between said configurations.

5. An infrared suppressor in claim 2 wherein said vanes comprise side walls having corrugations extending in the direction of the gas flow path across said vanes thereby increasing the effective length of the downstream edges of said side walls and promoting intermingling and therefore mixing of the hot gas stream and the cool ambient air induced through the hollow vanes, said side walls being connected at the leading edge of said vanes and having their downstream edges displaceable between said first and second positions.

6. An infrared suppressor as in claim 1 wherein the interior of said vanes between said side walls is exposed to ambient air whereby the displacement of said trailing edges varies the area of said gas stream flow path to thereby vary the flow of cooling air through said vanes and into said hot gas stream, thereby reducing the temperature of said hot gas stream by mixing with said ambient air.

7. An infrared suppressor as in claim 1 wherein said duct means follows an indirect flow path from the discharge of said gas turbine engine to the outlet of said suppressor whereby infrared radiation directly from the outlet components of said gas turbine engine is minimized.

8. An infrared suppressor as in claim 1 wherein:
   said duct means comprises inner and outer double wall ducts forming, respectively, the inner and outer bounds of an annular flow path from the gas turbine engine to the suppressor outlet; and
   said flow path means comprises means for connecting the interior of said double wall ducts to ambient air at one end and to the downstream edge of said vanes at another end;
   said double wall ducts forming an annular mixing section of constant flow area downstream of said vanes for hot gas and ambient induced air and a downstream diffuser section prior to discharging the flows of mixed gas and ambient air from said suppressor.

9. An infrared suppressor as in claim 8 wherein:
   said outer double wall duct has an annular inlet exposed to ambient air at its downstream edge and has a downstream facing annular outlet at its forward edge;
   said inner annular duct having openings exposing the space between the walls to said chamber at the downstream end of said duct and having a downstream facing outlet to the gas stream flow path adjacent the trailing edges of said vanes;
   said suppressor further comprises a closed downstream end to form a chamber and a series of hollow struts extending radially across said gas stream flow path exposed at the outer end to ambient air and at the inner end to said chamber.

10. An infrared suppressor as in claim 9 wherein said vanes each have a hollow radial support strut wo which said side walls are secured, said support strut being connected at its outer end to ambient air and at its inner end to said chamber to supply an additional source of ambient cooling air to said inner double wall duct.

11. An infrared suppressor as in claim 10 wherein said inner double wall duct is curved radially outward at its upstream end and radially inward at its downstream end to provide an indirect path for gases flowing from the outlet of said gas turbine engine to the suppressor outlet.

* * * * *